United States Patent
Warner et al.

(10) Patent No.: US 9,930,095 B2
(45) Date of Patent: Mar. 27, 2018

(54) SYSTEM FOR MANAGING EXTENSION MODIFICATIONS TO WEB PAGES

(71) Applicant: GOOGLE INC., Mountain View, CA (US)

(72) Inventors: Craig Warner, Palo Alto, CA (US); Luke Stone, Menlo Park, CA (US); Elysa Wesley Fenenbock, San Francisco, CA (US); Ronit Kassis, Sunnyvale, CA (US); Timothy Wong O'Connor, Moraga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/226,013

(22) Filed: Mar. 26, 2014

(65) Prior Publication Data

US 2015/0281318 A1    Oct. 1, 2015

(51) Int. Cl.
| | |
|---|---|
| G06F 15/16 | (2006.01) |
| H04L 29/08 | (2006.01) |
| G06F 17/30 | (2006.01) |
| G06F 21/57 | (2013.01) |
| G06F 21/56 | (2013.01) |

(52) U.S. Cl.
CPC ........ *H04L 67/02* (2013.01); *G06F 17/30861* (2013.01); *G06F 21/566* (2013.01); *G06F 21/577* (2013.01); *G06F 2221/033* (2013.01)

(58) Field of Classification Search
USPC ................ 709/203, 220, 223, 246
See application file for complete search history.

(56) References Cited

U.S. PATENT DOCUMENTS

| | | | | |
|---|---|---|---|---|
| 5,991,399 | A * | 11/1999 | Graunke ................ | G06F 21/10 380/228 |
| 6,321,267 | B1 * | 11/2001 | Donaldson .................... | 709/229 |
| 6,356,951 | B1 * | 3/2002 | Gentry, Jr. .................... | 709/250 |
| 6,477,550 | B1 * | 11/2002 | Balasubramaniam et al. ............................ | 715/234 |

(Continued)

FOREIGN PATENT DOCUMENTS

| | | |
|---|---|---|
| JP | 2003296192 A | 10/2003 |
| JP | 2007028014 A | 2/2007 |

(Continued)

OTHER PUBLICATIONS

International Search Report and Written Opinion received for PCT Patent Application No. PCT/US2015/022467, dated Jun. 18, 2015, 12 pages.

(Continued)

*Primary Examiner* — Michael Y Won
(74) *Attorney, Agent, or Firm* — Brake Hughes Bellermann LLP

(57) ABSTRACT

A method and system provide, using a microprocessor of computing device associated with a web publisher, content including a web page. The method includes accessing, by the web publisher, a list including at least one extension associated with a web browser rendering the content at a second computing device, and a key generated based on the content, the key being generated at a specific time after the providing. The method includes comparing a value associated with the key to an expected value to determine a difference between the key and the expected value.

18 Claims, 7 Drawing Sheets

(56) References Cited

U.S. PATENT DOCUMENTS

| | | | |
|---|---|---|---|
| 7,155,737 B1* | 12/2006 | Lim et al. | 726/2 |
| 7,506,022 B2* | 3/2009 | Wang et al. | 709/203 |
| 7,653,712 B1* | 1/2010 | Dubrovsky et al. | 709/223 |
| 7,797,415 B2* | 9/2010 | Peracha | 709/223 |
| 7,840,815 B2 | 11/2010 | Kakehi et al. | |
| 7,975,308 B1* | 7/2011 | Satish et al. | 726/26 |
| 8,176,321 B1* | 5/2012 | Perry et al. | 713/167 |
| 8,196,112 B1* | 6/2012 | Cansizlar | 717/126 |
| 8,200,962 B1* | 6/2012 | Boodman et al. | 713/161 |
| 8,667,487 B1 | 3/2014 | Perry et al. | |
| 8,756,617 B1* | 6/2014 | Boodman et al. | 719/328 |
| 8,850,010 B1* | 9/2014 | Qureshi | 709/225 |
| 8,977,707 B2* | 3/2015 | Dolph et al. | 709/217 |
| 8,997,253 B2 | 3/2015 | Kwon et al. | |
| 2003/0142560 A1* | 7/2003 | Terao | G11B 20/00086 365/200 |
| 2005/0154887 A1* | 7/2005 | Birk et al. | 713/168 |
| 2008/0070666 A1* | 3/2008 | Gatto et al. | 463/16 |
| 2008/0082523 A1* | 4/2008 | Momosaki | G06F 17/30787 |
| 2009/0019525 A1* | 1/2009 | Yu et al. | 726/3 |
| 2009/0190765 A1* | 7/2009 | Sweazey | H04L 9/0894 380/283 |
| 2009/0310779 A1* | 12/2009 | Lam et al. | 380/46 |
| 2010/0262501 A1 | 10/2010 | Son et al. | |
| 2010/0318964 A1* | 12/2010 | Bouldin et al. | 717/120 |
| 2011/0231666 A1* | 9/2011 | Guenther | G06F 21/32 713/186 |
| 2011/0247071 A1 | 10/2011 | Hooks et al. | |
| 2011/0283366 A1* | 11/2011 | Kwon et al. | 726/29 |
| 2012/0221865 A1* | 8/2012 | Hahn | H04N 21/4331 713/193 |
| 2013/0055340 A1* | 2/2013 | Kanai et al. | 726/1 |
| 2013/0182842 A1* | 7/2013 | Fasoli | H04N 21/2347 380/255 |
| 2013/0247030 A1 | 9/2013 | Kay et al. | |
| 2014/0047359 A1* | 2/2014 | Teigene et al. | 715/760 |
| 2015/0229613 A1* | 8/2015 | Baum et al. | 713/171 |
| 2015/0281318 A1* | 10/2015 | Warner et al. | 709/217 |

FOREIGN PATENT DOCUMENTS

| | | |
|---|---|---|
| JP | 2009146235 A | 7/2009 |
| JP | 2011086128 A | 4/2011 |
| JP | 2011253211 A | 12/2011 |
| JP | 2012507778 A | 3/2012 |
| WO | 2013168902 A1 | 11/2013 |
| WO | 2015/148651 A1 | 10/2015 |

OTHER PUBLICATIONS

Guha et al., "Verified Security for Browser Extensions", IEEE Symposium on Security and Privacy (SP), May 22-25, 2011, pp. 115-130.

Varshney et al., "A Novel Architecture and Algorithm for Web Page Change Detection", IEEE 3rd International Advance Computing Conference (IACC), Feb. 22-23, 2013, pp. 782-787.

"Introducing Content Security Policy", dated Jan. 16, 2014 from https://developer.mozilla.org/en-US/docs/Security/CSP/Introducing_Content_Security_Policy, 2 pages.

International Preliminary Report on Patentability received for PCT Patent Application No. PCT/US2015/022467, dated Oct. 6, 2016, 8 pages.

Office Action received for Australian Patent Application No. 2015236109, dated Mar. 17, 2017, 4 pages.

* cited by examiner

SYSTEM FOR MANAGING EXTENSION MODIFICATIONS TO WEB PAGES

TECHNICAL FIELD

This application generally relates to web technology, and more particularly, to web browser extensions and web pages.

BACKGROUND

Web browsers implemented on a web-enabled computing device allow users to access all kinds of content. Web browsers are configured to read programmatic code and render that code as web pages, which may include rendering both audio and visual content contained in various media files (e.g., image, video, and audio files), as well as performing other functions defined in the programmatic code. Web pages are generally implemented using programming languages such as HTML (including HTML5), CSS, and JavaScript, among a number of other available programming languages.

Some browsers allow users to install add-ons or extensions to the browser, where such extensions add functionality to the browser and operate as an integrated part of the browser. Browser extensions may be implemented using programmatic code that is written using the same programming languages that are used for implementing web pages, such as JavaScript. From a browser's perspective, extensions effectively function as web pages that are an integrated part of the browser once they are installed. By installing extensions that are of interest to him or her, a user can effectively create a custom browser experience that includes the functionality of the extensions they choose to install.

In current Internet systems, ensuring the reliability, security, and integrity of intended content delivery is challenging. Publisher websites have attempted to establish a level of accountability, predictability, and trusted content delivery, with varying degrees of success. However, third party browser extensions have the ability to infiltrate this trusted relationship in ways that can be unclear to the users and potentially damaging to all parties involved. Today, many browsers allow the creation and installation of extensions that can modify or interact with the browser, computer system, or content, in some cases modifying the content is ways that are not allowed or desired by certain parties, such as advertising blockers, advertising injectors, or various malware.

These third party extensions change the direct relationships between the web publisher and the user, which, if offered with the right controls, can have positive implications for both parties. However, if no controls are in place, many publishers and content providers may retreat from the open Internet behind closed applications or paywalls, making it more difficult for users to find and enjoy useful content. It is difficult for web publishers to know whether their content is being delivered consistently with the web publishers' terms of conditions of use. Moreover, it is difficult for web publishers to control the content, performance, or functionality that is being provided to users when third party extensions are able to modify the content.

SUMMARY

According to one general aspect, a method includes providing, using a microprocessor of computing device associated with a web publisher, content including a web page. The method includes accessing, by the web publisher, a list including at least one extension associated with a web browser rendering the content at a second computing device, and a key generated based on the content, the key being generated at a specific time after the providing. The method includes comparing a value associated with the key to an expected value to determine a difference between the key and the expected value.

Implementations may include one or more of the following features, alone or in combination with each other. The method may include, based on the comparing, determining a specific extension that modified the content, from the list of at least one extension. The determining may be performed by the microprocessor of the computing device associated with the web publisher, using iterative comparisons of a plurality of keys from a plurality of different browsers, to the expected value. The list may include all extensions installed in the web browser. The method may include locking the content being rendered on the web browser at a specific time identified by the web publisher. The locking may be performed by the web browser. The method may include generating the key using the web browser. The method may include creating the key using a checksum of the content. The method may include creating the key using a trace. The method may include creating the key based on a text file version of a document object model of the web page. The method may include recreating the content using the key. A specific extension may modify the content when it was being rendered using the web browser.

Other implementations include corresponding systems, apparatus, and computer programs, configured to perform the actions of the methods, encoded on computer storage devices.

One or more of the implementations of the subject matter described here may provide one or more of the following advantages. Web publishers can determine and control content control the content, performance, or functionality that is being provided to users. details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In various examples, a web browser may include or be configured to interact with one or more browser extensions.

In this context, a "browser extension" may include one or more web pages packaged or grouped together as a definable whole, and configured to extend the functionality to the web browser. As described here, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined here to include an area outside of a webpage displayed in the browser (such as the borders of a web browser window, which include the window frames, menus, toolbars and scroll bars). Selecting the icon or the other user interface may activate the functionality of the extension within the browser.

Extensions may modify web pages, for example, to block advertisements. In some cases, malicious extensions may inject content, illegal activity, or advertisements to web pages against a web publisher's intent, thus harming the web publisher's brand. A web publisher as referred to here means a content provider associated with a web page, such as an online newspaper or online store, as examples.

Therefore, in some cases, users visiting websites may have content (articles, text, images, videos, links, ads, etc.) that appears to be coming from a trusted web publisher's system, but in reality, the content has been replaced by third party content without the user or the web publisher knowing. In some cases, advertisers can also lose revenue when charged for ads that are not actually seen. For example, extensions may remove or replaces ads, or may modify an order of elements on the web page. Extensions that are injecting ads might shuffle elements on the page to make sure their ads appear on prime locations at the expense of the web publisher's content.

Systems and methods described here provide a way for web publishers to enable the management of extension behaviors on web pages provided by the web publisher.

Figure 1:
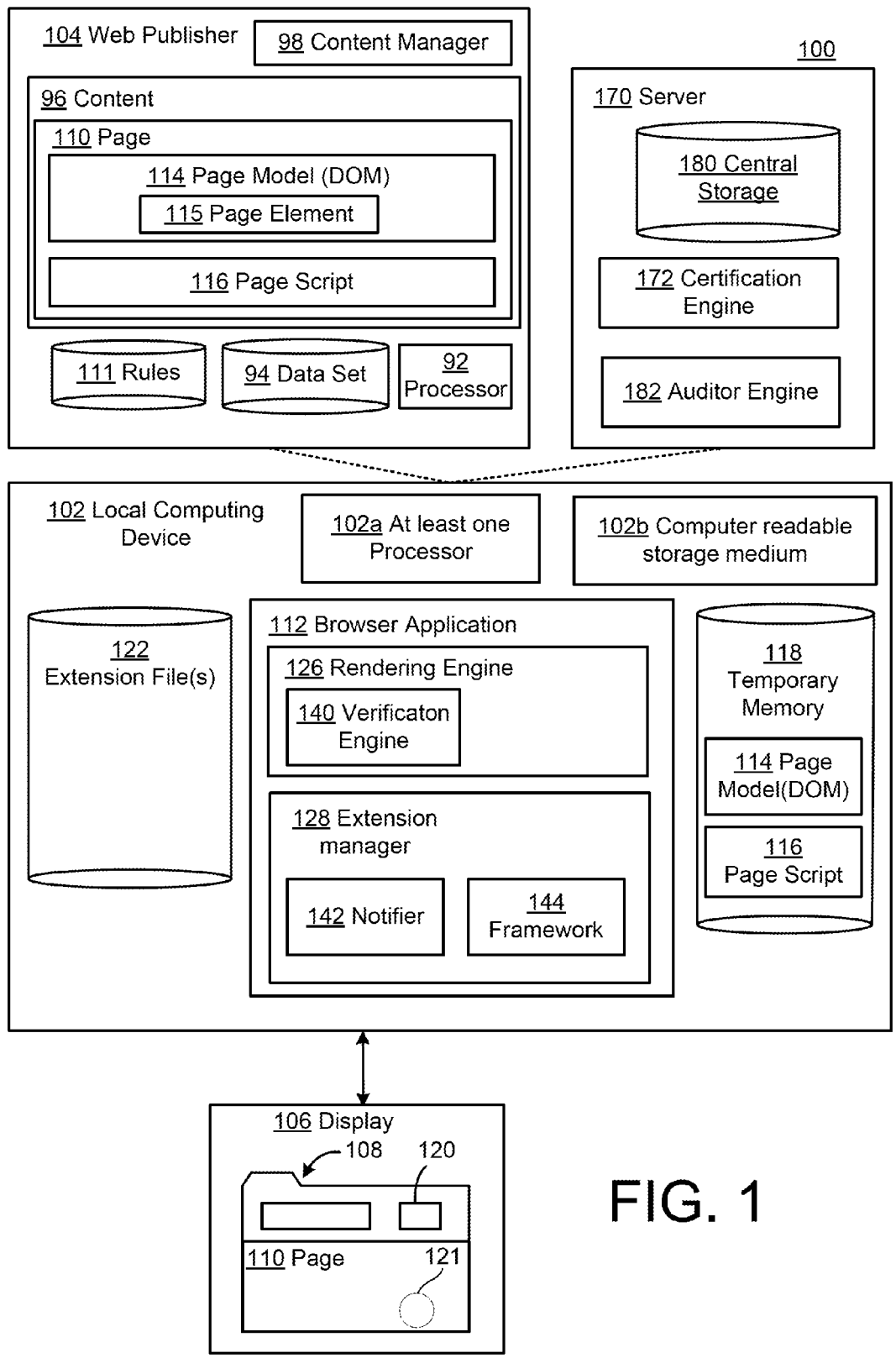
FIG. 1 is a block diagram illustrating an example system that implements browser extensions.

FIG. 1 is a block diagram of an example system that implements browser extensions. In the example of FIG. 1, a local computing device 102 is illustrated as communicating with a remote web publisher 104 in order to provide, using a display 106, a browser window 108 which contains a page 110 that is stored at the remote web publisher 104. The web publisher 104 may be a computing device such as a server, for example.

The local computing device 102 may represent virtually any computing device that may be configured to execute a browser application 112, and to communicate with the web publisher 104. For example, the local computing device 102 may include a standard desktop or personal computing device, a laptop, notebook, or netbook computer, a tablet computer, or a smartphone, television, or other mobile computing device. Such computing devices, and other computing devices, may be configured to access the web publisher 104 over one or more computer networks, in various manners, such as the public Internet, private intranet, or other network, to thereby access the web publisher 104. Consequently, the display 106 may be understood to represent virtually any type of display, e.g., monitor, touchscreen, or any other type of visual or auditory display.

In the examples that follow, it is generally assumed that the local computing device 102 and the browser application 112 communicate with the web publisher 104 over the Internet, typically using protocols for identifying, accessing, and rendering the page 110, e.g., from a web server represented by the web publisher 104. However, it will be appreciated that such examples are provided merely for the sake of clarity and conciseness, and, as just referenced above, are not intended to be limiting of the various manners in which the local computing device 102 may obtain, process, or provide content in association with the browser application 112 and the browser window 108.

Thus, in the types of examples just referenced, it generally may be assumed that the page 110 represents any of the many types of webpages that are available over the public Internet. For example, in a simple scenario, the page 110 may represent a substantially static page that includes text, sound, images, advertisements, or other content that may be desired by a user of the local computing device 102 and that may be displayed within the browser window 108. In other examples, the page 110 may include many types of dynamic or interactive content, which often may be manipulated by the user within the context of the browser window 108. In many scenarios, the page 110 and/or associated executable code may be understood to represent an application that may execute partially or completely at the web publisher 104 (e.g., may utilize the processor, memory, and other hardware/software resources of the web publisher 104), while providing associated functionality and features to the user via the browser window 108 (and perhaps executing at least partially locally at the local computing device 102). As just referenced, such webpages and associated functionalities and applications are implementable using various, conventional programming languages and techniques, such as, for example, hypertext markup language (HTML), Asynchronous JavaScript™ (AJAX), eXtensible Markup Language (XML), JavaScript™, JavaScript object notation (JSON), and many other types of code which may be executed.

In the example of FIG. 1, content 96 at the web publisher 104 includes the page 110, which is illustrated as including, or being associated with, a page model 114 and a page script 116. Generally speaking, the page model 114 includes page element(s) 115 and provides a data structure that defines the structure, content, and appearance of the page 110 with respect to a programming language in which the page 110 is written. The page model 114 and the page script 116 can be stored in temporary memory 118.

In specific examples described here, the page model 114 may represent a document object model (DOM) data structure. Such a DOM, as just referenced, represents a data structure (typically, a tree-like data structure) that itself represents source code (e.g., HTML) of the page 110.

The web publisher 104 may also include a content manager 98 that may provide content 96 to other computers such as the local computing device 102. In some implementations, the content manager 98 may also be used to define rules 111 that the web publisher 104 can exchange with a browser or application environment. Using the content manager 98 and the rules 111, the web publisher 104 may apply, control, monitor, audit, give, or withhold permissions or rights in real time to extensions or other applications. As one example, an online newspaper may withhold or modify which content 96 it provides based upon which extensions may have control over the content before it is presented to the user. In some implementations, as discussed in more detail below, the web publisher may have access to an auditable record of certain extension-based modifications or interactions with a web page, which can be used for accounting or other purposes. The auditable record may be stored, for example in a data store as a data set 94. The data set 94 may also store other values, such as values indicative of modifications to the content 96, as discussed in more detail below with respect to FIG. 6. In various implementations, the data set 94 may be stored remotely from the web publisher 104 and the web publisher may access the data set 94 on an as-needed basis, for example using a processor 92 as shown in FIG. 1. The processor 92 may be a microprocessor as described in more detail with respect to FIG. 7. The rules 111 may also be stored in a database or other data store. In some cases, the rules 111 may be stored remotely from the web publisher 104 and the web publisher may access the rules 111 on an as-needed basis, for example using the processor 92.

As examples, the rules 111 may include rules to enable the management of extension behavior. An example rule might allow a browser extension to reformat the page, withhold different kinds of information from being rendered, or display information to the user in a different order than originally provided by the page. Another example rule might control which third party partners are allowed to operate on the page. Another example rule might allow an extension to make select changes or substitutions to elements of the page. The changes or substitutions may be defined per domain, per site, per page, per article, or in other ways. As yet another example, a rule may give multiple web publishers a way to define which content could be co-delivered with other publishers. For instance, an online newspaper and an online magazine could collaborate to enable the news section from the online newspaper to be delivered with a Hollywood section of the online magazine.

As described here, browser extensions may be utilized in the system 100 to provide additional features or functionalities in association with the browser application 112, and thus with respect to the browser window 108. The functionality of extensions may include but are not limited to observing and modifying network traffic and modifying the page model 114 of the page 110. Other functionality may include interacting with the user, and adding buttons and other user interface elements to the browser and handling their interaction with the user.

As may be understood from the above description, extensions defined by extension files 122 may generally refer to browser extensions, add-ons, plug-ins, web applications (web apps), or any other program code that is designed to augment an appearance or functionality of the browser application 112 in providing the browser window 108 or the page 110. Extension files 122 may in particular perform modifications to network requests related to web page 110, such as canceling requests for individual resources, redirecting the request for web page 110 or referenced resources, modifying request and response headers of web requests related to web page 110, or contributing authentication information to retrieve web page 110. For example, extensions may in some cases, replace ad content 121 in the page 110 with other ad content, or may block the appearance or display of the ad content 121. The ad content 121 is content that the web publisher has been paid to display. If the ad content 121 is replaced with other content by a hijacking extension, for example, then advertisers will no longer want to advertise with the web publisher, or revenue for the web publisher may decrease based on decreased ad views.

In the simplified example of the system 100 of FIG. 1, the extension files 122 are illustrated as being stored locally on the local computing device 102. For example, a user of the local computing device 102 may program and store the extension files 122 for use by the browser application 112. In additional or alternative examples, however, it may be appreciated that some or all of the extension files 122 may be accessed remotely. For example, in many cases, a particular extension may be packaged within a single folder or archive that may then be accessed by the browser application 112. For example, a provider and/or distributor of the extension files 122 (not specifically illustrated in the example of FIG. 1) may construct and package the extension files 122, and a user of the system 100 may thereby download and install a desired extension, including accessing, downloading, and installing the extension files 122 at the local computing device 102, as shown.

The browser application 112 may include a rendering engine 126 that is used to convert the page model 114 of a page 110 into information that can be displayed to the user in browser window 108. The rendering engine 126 may include a verification engine 140 that is used to parse meta tags defined by the framework 144. The verification engine 140 may grant appropriate extensions certain rights to interface with or modify the page 110 in accordance with the publisher defined meta tags. The verification engine 140 may perform these actions in real-time. The verification engine 140 may revoke from certain extensions the privilege to interface with or modify the page 110 in accordance with the publisher defined meta tags. In some implementations, the verification engine 140 may present contractual terms associated with the web publisher 104 to the extension owner, and upon the extension owner's acceptance of the proposed contractual terms, the verification engine 140 may grant that extension the privilege to interface or modify the page 110 in accordance with the terms of the ratified contract. In some implementations, the verification engine 140 may programmatically log the transaction at a server such as the server 170, bill the extension owner, and compensate the publishers at appropriate intervals, as examples.

The browser application 112 may include an extension manager 128 that may be responsible for installing, loading, and executing extensions. It may be responsible for handling communication between the extensions 122 and the rendering engine 126. As such it may dispatch events to certain extensions 122, collect their intended modifications to web requests, send them to the verification engine 140, and send the results back to a network stack. Parts or all of this functionality may be executed by other components of the browser application 112.

The extension manager 128 may also include a notifier 142 that may expose to a web publisher 104 certain browser elements, such as DOM elements. As discussed in more detail below with respect to FIG. 3, the DOM elements may include, for example, a name of certain or of each browser extension installed on the local computing device 102 or the browser application 112, a classification enumeration for each extension, or a list of operations or actions that each browser extension may perform on a given web page (for example, create, read, update, delete).

In some cases, the extension manager 128 may also include a framework 144 (which may be programmed, for example, in JavaScript™) that allows publishers to programmatically iterate over a list of browser extension DOM elements. The framework 144 facilitates insertion of publisher-defined web page meta tags that may regulate how specific extensions that may interoperate with the page 110. The framework 144 may specify classifications of extensions may interoperate with the page 110. The framework 144 may specify how operations or actions in general may be applied to the page 110, such as update, read, delete, write, etc. In some implementations, the framework 144 may facilitate the definition of contractual terms by which a web publisher 104 may request payment from an extension owner for the right to perform various operations or actions on the page 110.

Of course, it may be appreciated that the browser application 112 may include, or be associated with, various features, functions, operational modules, or other elements that are not specifically illustrated in the context of FIG. 1. Similarly, it may be appreciated that the terminology used in association with the rendering engine 126 and the extension manager 128 is merely for the sake of example, and that the various types of browser applications 112 that exist, or that may exist in the future, may use different terminology when referring to the various concepts described here.

The system 100 may also include a remote server 170. The server 170 may include a central storage component 180, a certification engine 172, and an auditor engine 182. In some cases, the central storage component 180 may store an audit trail or log corresponding to acts of various extensions on web pages. The certification engine 172 may be used to certify that browser extensions perform only the acts they are defined to perform. For example, the server 170 may automatically certify certain browser extensions, and assign those certified browser extensions classifications or sign the browser extensions with digital certificates based on auditing or test results of actions performed by the browser extensions (i.e., to verify that the browser extensions perform only the actions they allege to perform). The auditor engine 182 may be used to track and log certain actions of various browser extensions, e.g., in conjunction with the central storage component 180 and to evaluate the actions based on permissions and definitions associated with the extensions, which may also be stored in the central storage component 180.

In some cases, the browser application 112 may access the central storage component 180 in real time to determine that an extension installed in the browser application has certain permissions. The browser application 112 may share that information with a web publisher 104 associated with a page 110. For example, as discussed in more detail below with respect to FIG. 3, the browser which is requesting a page or a type of content may notify a web publisher 104 that the browser application 112 has extensions A, B, and C installed, and these extensions may do actions X, Y, and Z. The web publisher 104 may then, based on this information, choose to perform certain actions such as withhold content, serve a different form of the content, redirect a user of the browser application 112 to a different type of content (e.g. PDF or image), etc. When a user receives the content, the user may see how a browser extension has changed content from an original page provided by the web publisher 104.

As also shown in the example of FIG. 1, the browser application 112 may include an extension manager 128 that may be configured to implement some or all of the functionality of a particular extension, such as an extension associated with the extension files 122. For example, the extension manager 128 may be configured to cause the rendering engine 126 to execute or otherwise render particular files or pages associated with the extension of the extension files 122. The extension manager 128 may also be configured to execute background pages and content scripts, as discussed in more detail below with respect to FIG. 2. For example, a content script may be written to examine any page loaded in the browser application 112 for rendering within the browser window 108 in order to detect a presence of a specific type of content (e.g., a non-linked webpage, or an RSS feed). That is, the content script may execute such techniques on content of any webpage loaded and rendered within the browser window 108. In the event that the content script detects the specified type of content, the content script may pass a message to the extension so as to notify the extension of the detected presence of the specified type of content. In some cases, the extension may perform an actual modification of the browser window 108, (e.g., to execute a page action with respect to browser window 108, such as displaying the extension icon 120).

In the example of FIG. 1, the browser application 112 is illustrated including discrete functional modules. However, it may be appreciated that such illustration is merely for the sake of example, and that other implementations are possible. For example, a single element of the browser application 112 may be implemented by two or more elements. Conversely, two or more components of the browser application illustrated in FIG. 1 may be executed using a single component. Further, in the example of FIG. 1, the local computing device 102 is illustrated as including at least one processor 102a, as well as computer readable storage medium 102b. That is, for example, the local computing device 102 may rely on two or more processors executing in parallel to achieve a desired result. Meanwhile, the compute readable storage medium 102b may represent any conventional type of computer memory which may be used, for example, to store instructions which, when executed by the at least one processor 102a, cause the browser application 112 to perform various functions, and other relevant functions described here. Additional or alternative example implementations of the system 100 of FIG. 1 are possible.

Figure 2:
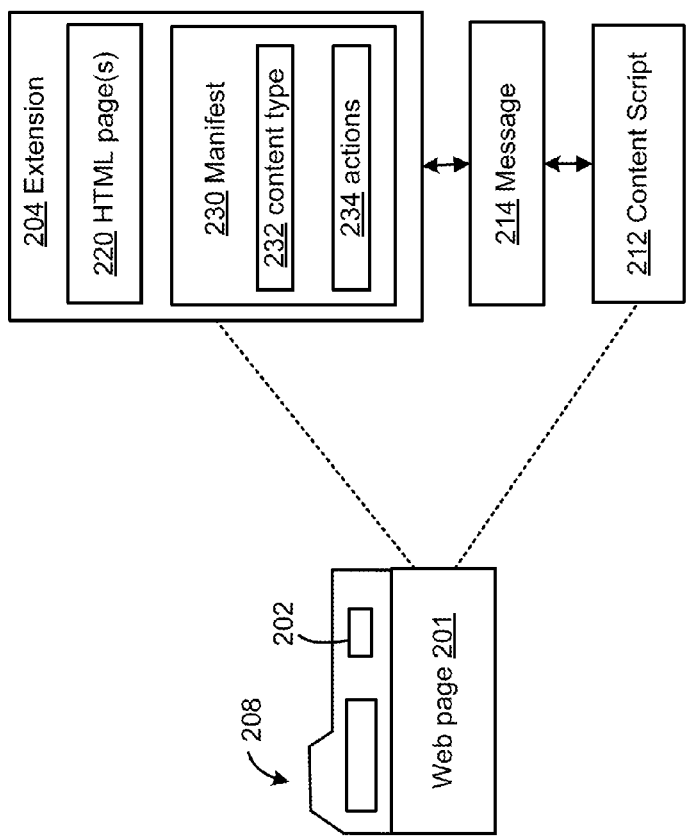
FIG. 2 is a block diagram of an example of a browser extension in a web browser.

FIG. 2 is a block diagram of an example of a browser extension in a web browser. As referenced above, extension files may include various different types of files. For example, an extension 204 as shown in FIG. 2 may include a manifest file 230 that gives information about the extension 204, such as, for example, the most important files and the capabilities that the extension might provide and the permissions the extension may have to interact with web pages and with a browser application. For example, the manifest 230 may include a name of the extension and at least one content type 232 that the extension 204 seeks to act on. For example, a content type may be an image, text, hyperlink, etc. The manifest 230 may also indicate one or more actions 234 or operations that may be performed by the extension 204, such as read, write, update, delete, etc., as described in more detail below with respect to FIG. 3. It may be appreciated that, as referenced above, extensions may include various other types of files. For example, the extension 204 may include at least one HTML page 220, such as, for example, an HTML page associated with a browser action providing a pop-up window in association with the browser window 208 or a content script file 212 that is capable of modifying the content of a page model of a webpage 201 to be displayed within the browser window 208, (e.g., to execute a page action with respect to browser window 208, such as displaying the extension icon 202).

With respect to the execution of the extension 204, other than the content script 212 as described below, execution thereof may proceed similarly to, but in a separate process than that of, the rendering engine of the browser application shown in FIG. 1. The content script 212 may represent, or include, a script that enables an associated extension to interact with webpages, e.g., the web page 201. For example, the content script 212 may be implemented as JavaScript™ that executes in the context of the web page 201 as loaded into the browser.

Content scripts can find unlinked URLs in web pages and convert them into hyperlinks, increase font size to make text more legible, and add or block advertisements or other content. Content scripts can indirectly use browser APIs, get access to extension data, and request extension actions by exchanging messages 214 with their parent extension. Content scripts can also communicate with web pages using the page model 114 (e.g., DOM) shown in FIG. 1.

The content script 212 code may always attempt to be injected in a webpage, or may only sometimes be injected depending upon how the content script is written. Further, an extension 204 can insert multiple content scripts into a page, and each of these content scripts may have multiple files such as JavaScript™ and CSS files.

Content scripts, generally speaking, may be configured to read details of webpages visited by a browser application, and may be further configured to make changes to such pages. For example, the content script may be configured to read and/or modify the page model (e.g., DOM) of the page 201. In example implementations, however, the content script may be restricted from accessing or modifying the page model (e.g., DOM) of the web page 201 by the rendering engine of the browser application based on rules provided by a web publisher associated with the web page 201, as discussed above with respect to FIG. 1. In this way, the web publishers may manage or track extension behavior on certain web sites.

Figure 3:
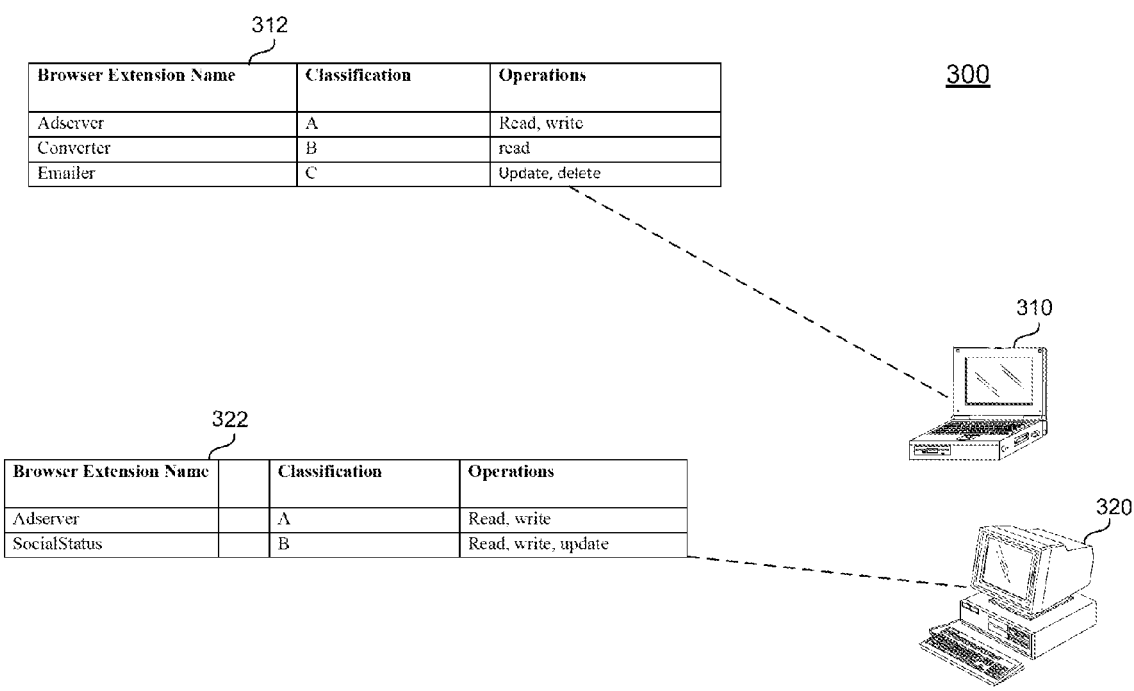
FIG. 3 is a block diagram of example classifications and operations of browser extensions.

FIG. 3 is a block diagram of example classifications and operations of browser extensions. The system 300 shown in FIG. 3 includes two computing devices, a device 310 and a device 320. Each of the devices may include a browser application such as the browser application described above with respect to FIG. 1. The browser application may include browser DOM elements that expose to a web publisher, such as the web publisher shown in FIG. 1, various browser extension elements, with user consent. For example, the browser extension elements may include a name of each browser extension installed on the device, a classification enumeration for each extension, and a list of operations each browser extension may perform on a given web page (for example, create, read, update, delete).

For example, as shown in FIG. 3, various browser elements 312 may be exposed to a web publisher by the browser application of the device 310. The browser elements 312 include the names, classifications, and operations of three browser extensions installed on the browser application operating on device 310. The first browser extension has a name "Adserver", a classification "A", and operations "Read, write." The second browser extension has a name "Converter" a classification "B" and operations "Read." The third browser extension has a name "Emailer" a classification "C" and operations "Update, delete".

As another example, the browser elements 322 are associated with the browser application operating at device 320. The browser elements 322 include the names, classifications, and operations of two browser extensions installed on the browser application operating on device 320. The first browser extension has a name "Adserver", a classification "A", and operations "Read, write." The second browser extension has a name "SocialStatus" a classification "B" and operations "Read, write, update."

A client-side framework (for example, in JavaScript) such as the framework 144 of FIG. 1 may allow web publishers to programmatically iterate over the list(s) of browser extension DOM elements. This framework facilitates insertion of publisher-defined web page meta tags that regulate how specific extensions may interoperate with a web page served by the web publisher. The classifications of extensions may interoperate with the page. Operations in general may be applied to the web page. The framework may facilitate the definition of contractual terms, for example by which a web publisher may require payment from an extension owner for the right to perform various operations on a page.

Figure 4:
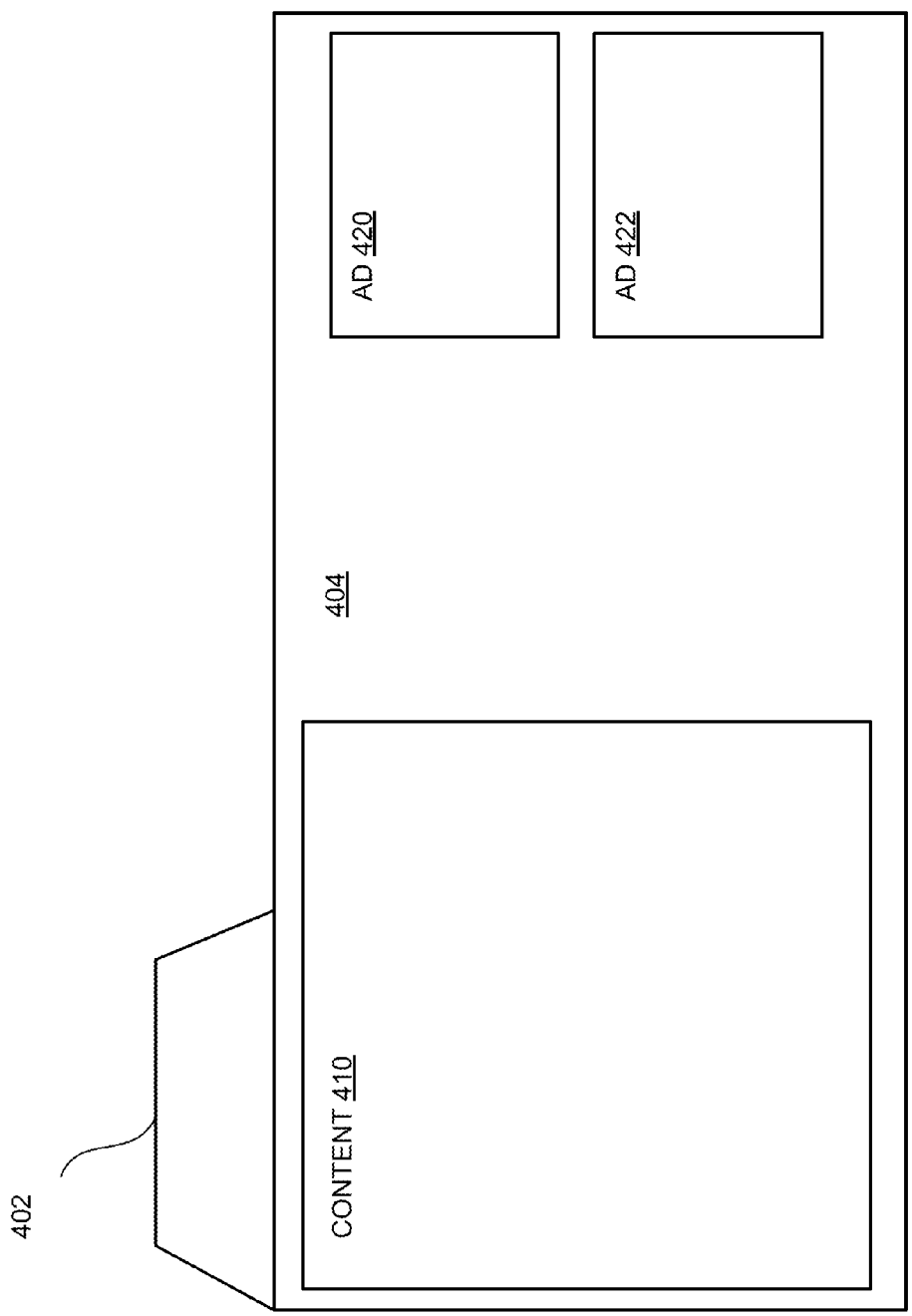
FIG. 4 is a diagram of an example user interface of a web browser.

FIG. 4 is a diagram of an example user interface of a web browser. The user interface may be implemented in a tab 402 or window of a web browser such as the browser application discussed above with respect to FIG. 1. The tab 402 may display a web page 404 including content 410 as well as ad 420 and ad 422. In some cases, an extension operating in the browser application may seek to modify or block one of the ads, such as the ad 420. In some cases, an extension may seek to replace the content 410 with other content not provided by a web publisher. In some cases, an extension may seek to replace the ad 422 with another ad or with other content.

For web publishers to maintain trusted brand integrity and authority, they need better control over the content they provide. Control over the extensions is twofold. In the current business model a web publisher, such as a newspaper, is organized to serve ads in order to continue to deliver free or low cost content to the end user. Furthermore, the newspaper has legal obligations to its advertising partners to ensure brand integrity is maintained by appropriately serving ads against the right stories. For instance, a chocolate supplier might not want its advertisements placed next to a story related to increased diabetes and obesity rates. Today's ad-blocker extensions, at best, remove revenue sources that publishers use to ensure continued high-quality low cost content delivery to its users. Today users agree to the implied terms of service from service providers to receive content in combination with advertising, or have the opportunity to opt-out by purchasing into models that give them limited advertising or add-free content. But, the extension mentioned above, merely blocks ads from being served. In another scenario, the ad-extension replaces the newspaper ads for its own, creating liability for the newspaper when the chocolate ad gets served against the wrong article.

Extensions can also provide service to publishers that they might not otherwise be able to self-support. For instance, consider a hypothetical example of a local B&B called Mamie's Lodge that has finally established a web-presence. As a trusted brand, they have also started serving local ads on their reservations site. Mamie's Lodge would like to enable a trusted extension to provide currency conversion on their site, but Mamie's Lodge does not currently have the ability to control whether its users are getting accurate conversion rates.

Extensions also affect users. For example, imagine that a user, "Susie" reads the fashion, weather, and wedding section of the online newspaper everyday. She also likes to read the topline news, but this is usually at the bottom of her list. She would love to have a personalized online newspaper homepage that puts her favorite articles first. She could actively choose her favorite articles, but would prefer not to spend the time doing so. If she could install an extension that would track how much time and how often she reads sections of the newspaper and update the article layout of personalized homepage accordingly, then she would read the online newspaper even more. The online newspaper would like to support this effort but doesn't yet have the capabilities. If the newspaper could control who the provider of this service was, then they would be able to ensure brand integrity and offer a better user experience.

As yet another example, extensions can provide services to users of mobile devices. For example, consider a user, "Tom", who just bought the latest smart watch. He is trying to stay away from his devices as much as possible, but there are a few headlines he is always on the lookout for. He would like to have certain online newspapers push specific topics to his watch, which would be integral to his fast-paced workday. These publishers might co-mingle their content if they could guarantee the right delivery.

Figure 5:
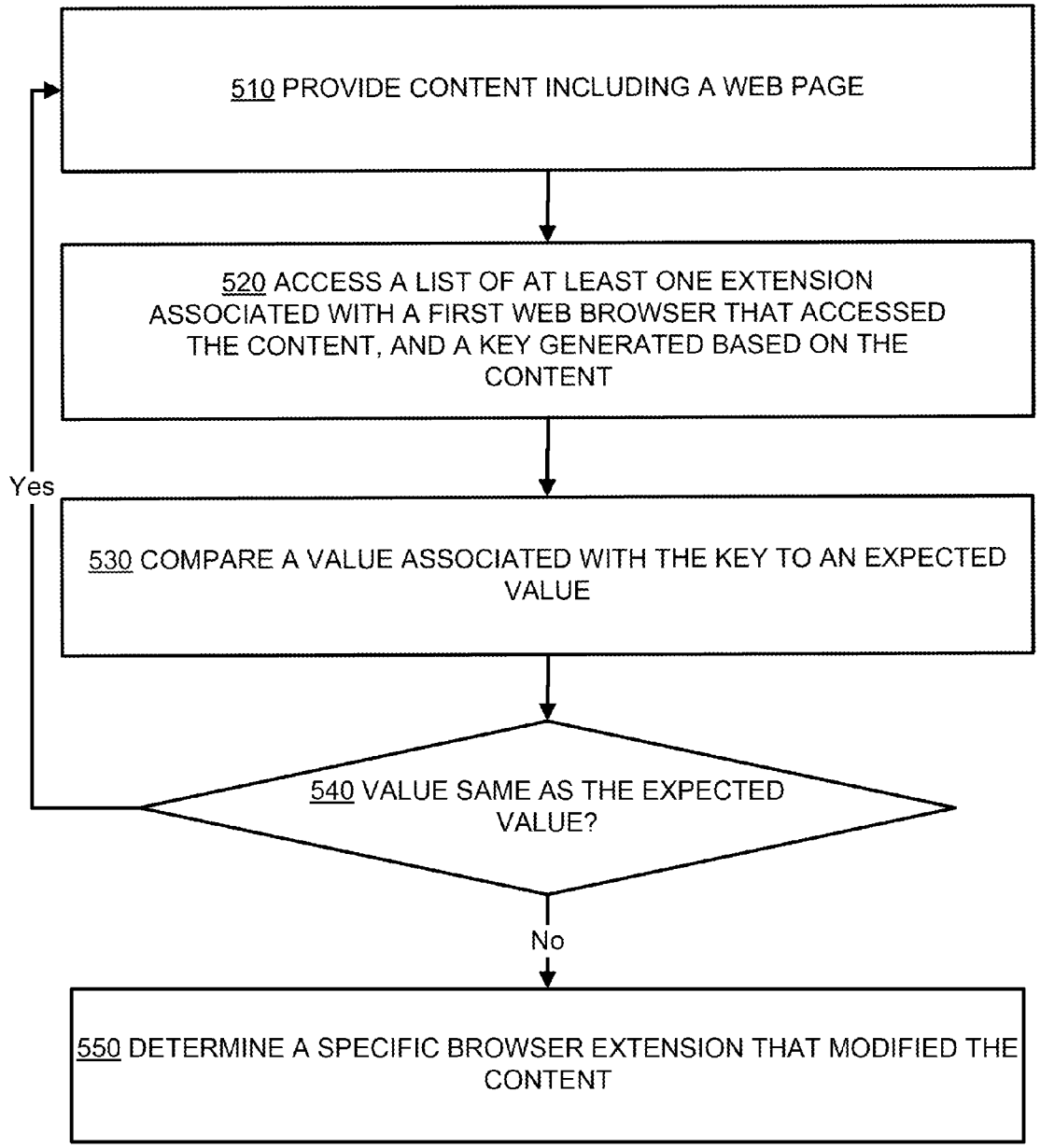
FIG. 5 is a flowchart illustrating a process for detecting browser extensions that have made modifications to content, in accordance with an example implementation.

FIG. 5 is a flowchart of a process for detecting browser extensions that have made modifications to content, in accordance with an example implementation. The process shown in FIG. 5 may be performed at least in part by a computer system such as the system 100 shown in FIG. 1, for example the web publisher 104 shown in FIG. 1. The web publisher may provide content including a web page (510). For example, the content may include a web page 110. The browser application 112 shown in FIG. 1 may render the page 110 using the rendering engine 126. The browser may also lock the content at a time specified by the web publisher 104, for example by locking the DOM of the page 110. For example, the browser may prevent scripts, plugins, popups, or browser extensions from operation on the DOM of the page 110 after the time specified by the web publisher, for example by using a sandbox attribute of a W3C IFrame Sandbox Attribute.

The web publisher 104, for example, using the processor 92 shown in FIG. 1, may access a list of at least one extension associated with a first web browser that accessed the content (e.g., browser application 112), and may also receive a key generated by the web browser, based on the content (520). The first web browser may execute a function on the content to generate the key. As an example of the function, the first web browser may take a screenshot of the content being rendered on the web page. As another example, the browser may execute a checksum of the content to generate a count of the number of bits in a transmission of the content that is included with the content. The first web browser may, as another example, execute a trace of the content. For example, the web browser may execute a trace to create a log to record information about the browser process, the rendered process, and the content rendered by the browser, or to log information about data being exchanged by a server and the web browser. The data exchange may include debugging controls, server variables, cookies, content that is rendered, and other information. In some implementations, a result of executing a trace is a record (such as a trace file) that includes event times for events that occurred in a process such as a browser process. As an example, a trace could include a record that the publisher content was merged with a second set of content from a different publisher. The record could include any modifications of formatting leading to a final user view. The record could be used to make modifications in the future to alter the ordering of content, or to pay content authors.

As other examples of the function, the first web browser may save the DOM as a text file, or may save a number and location of different tags on the page 110, or the type of elements on the page 110. The function may be reversible, such that a system such as the web publisher 104 may generate the content from the key and not just the key from the content. For example, if the key includes the DOM as a text file, the web publisher may recreate the content using the text file. The web publisher could, as an example, change the length of content based on the font size as modified in the new key, returning more concise content for a larger font size, and more complete content for a smaller font size.

The web publisher 104, for example, using the processor 92, may compare a value associated with the key to an expected value (530). For example, if the first web browser executed a checksum function on the content to generate a number of bits and associated the number of bits with the key, the web publisher can compare the number of bits associated with the key to an expected number of bits that the web publisher expects will be associated with the content, for example based on the original content as provided by the web publisher. The expected value may be a value that represents no modifications to the content. The web publisher 104 may determine that the value is not the same as the expected value (540, no). This determination may indicate that the content that was rendered by the first web browser was in some respect different from the content originally provided by the web publisher 104, which in turn may indicate that a browser extension modified the content when it was rendered by the first web browser. For example, a browser extension may have added or removed advertisements associated with the content, changed the location of text, deleted text, highlighted visual elements of a web page, added hyperlinks, or modified other aspects of the content. The web publisher 104 may determine a difference between the value and the expected value. The web publisher 104, for example using the processor 92, may then determine a specific browser extension from the list (550) that modified the content, based on the difference, for example as described in more detail below with respect to FIG. 6. In some implementations, for example, if the list only contains one browser extension, the web publisher may avoid the determination because the web publisher may be able to automatically determine that the single browser extension from the list modified the web page or content. In some implementations, the web publisher may analyze a plurality of lists, a plurality of keys, and a plurality of expected values, either iteratively or in real-time, to deduce which browser extension(s) modified the content. The plurality of lists, keys, and expected values may come from various web browsers and computing devices. For example, the web publisher may analyze a set of 100 keys and 100 lists of extensions to determine which browser extension(s) changed the content. In one example, the web publisher may send the same content to 100 different browsers that each may have a different set of extensions installed. The web publisher then receives information about which extensions modified the content. The web publisher may then look for extensions that are common to all of the browsers that modified the content, to determine which extension(s) may have modified the content. For example, the web publisher may determine that 40 of the browsers modified the content. Of those 40 browsers, all have the same extension "A" and no other extensions in common. In that case, the web publisher could determine that extension "A" likely caused the modification to the content. Alternatively or additionally, the web publisher may determine that all 40 browsers have extensions "A", "B", and "C" installed, and that some of the other 60 browsers also have extensions "B," and "C" installed, yet the other 60 browsers did not modify the content. In that case, the web publisher could also detect that extension "A" likely caused the modification to the content. The web publisher may use iterative comparisons over a number of minutes, hours, days, or even weeks, and such comparisons may be continuous and ongoing, to provide the web publisher with updated data regarding modifications made by extensions to content provided by the web publisher.

The process shown in FIG. 5 may operate on multiple web browsers operating in multiple computing devices at various locations, at the same time, in real-time, without any delay from a user's perspective. In various implementations, for example, as discussed in more detail below with respect to FIG. 6, the web publisher 104 may receive a list of all browser extensions installed or operating in a web browser rendering the content. In various implementations, some or all of the process shown in FIG. 5 may be performed by a third party computer. For example, some or all of the analysis in steps 520-550 may be performed by a third party computing device. In such an example, the third party computing device may provide or make available for access the results of the analysis for the web publisher 104. For example, in one implementation, a web browser may send a third party server (such as the server 170 shown in FIG. 1) a list of all extensions installed in the web browser, and the key generated by the web browser based on the content. The third party server may expect to receive a certain value for the key if no browser extension modified the content on the web page. If any of the browser extensions in the list modified the content on the web page, the value of the key may be different than a value the third party server expects to receive. The third party server may consolidate the different values and create a report for the web publisher. For example, the report may include a list of extensions that have modified content, and which aspects of the content each extension has modified, and the third party server may send the report to the web publisher or make the report available for the web publisher to download from a certain website via a secure login, for example.

Figure 6:
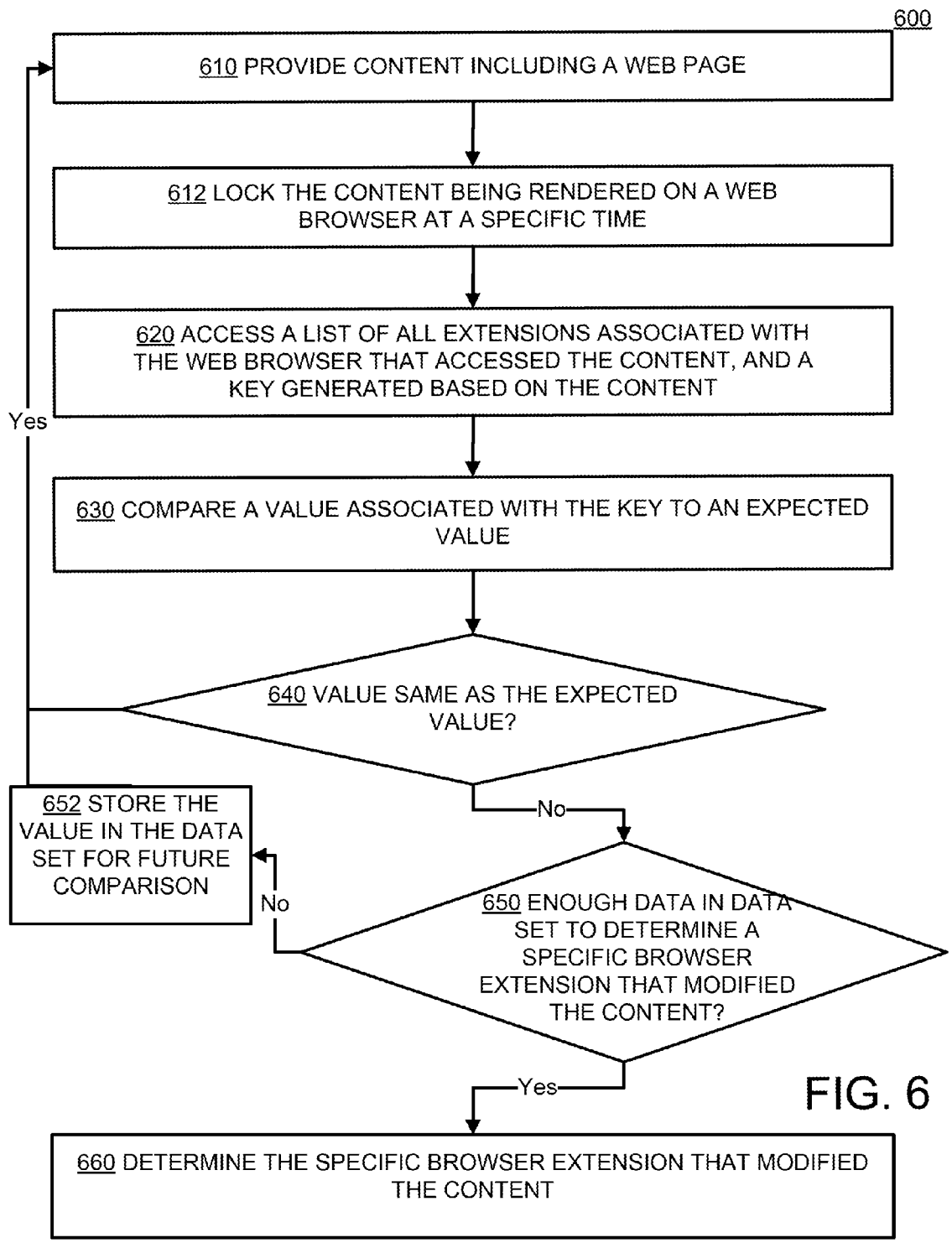
FIG. 6 is a flowchart illustrating another process for detecting browser extensions that have made modifications to content, in accordance with an example implementation.

FIG. 6 is a flowchart illustrating another process for detecting browser extensions that have made modifications to content, in accordance with an example implementation. The process shown in FIG. 6 may be performed at least in part by a computer system such as the system 100 shown in FIG. 1, for example the web publisher 104 shown in FIG. 1. The web publisher may provide content including a web page (610). The web page may be, for example, a portion of an online newspaper. A web browser at another computing device may lock the content at a specific time (612). For example, the web browser may prevent scripts, plugins, popups, or browser extensions from operation on the DOM of the page 110 after a time specified by the web publisher, for example by using a sandbox attribute of a W3C IFrame Sandbox Attribute.

The web publisher may access a list of all extensions associated with the web browser that access the content, and the web publisher may also access a key that was generated by the web browser based on the content (620). The web publisher may compare a value associated with the key to an expected value (630). The web publisher may determine if the value is the same as the expected value (640). If so, the web publisher may continue to provide content (610). If not (640, no), the web publisher may determine the difference between the value and the expected value, and also determine if there is enough data in a data set to determine a specific browser extension that modified the content (650). The data set may be the data set 94 as shown in FIG. 1, for example. As one illustrative implementation, the web publisher may access the list of all extensions associated with the web browser that access the content (620). If there is only one browser extension in the list of all extensions associated with the web browser, then the web publisher may have enough data to determine which browser extension modified the content—the one browser extension. As another example, the list of all browser extensions may include the browser elements 312 in FIG. 3. In that example, if an element (e.g., an ad) was deleted from the content being rendered on the web browser, the web publisher may be able to determine, based on the operations associated with the browser extensions from the browser elements 312, that only one specific extension from the list was even capable of deleting content. In that example, the specific extension would be the "Emailer" browser extension shown in the browser elements 312—the only extension from the browser elements 312 that has a delete operation as a possible operation. In that case, the web publisher would have enough data to determine which extension modified the content. If so, (650, Yes), the web publisher may determine the specific browser extension that modified the content (660). If not (650, No), the web publisher may store the value in the data set for future comparisons, (652), and may continue to provide content (610). In such an example, the web publisher may make a number of iterative comparisons using data from various other computing devices and web browsers to determine which browser extension made modifications to the content. The iterative comparisons may be performed over a number of seconds, minutes, hours, or even days. The web publisher may store the data set 94 in a database associated with the web server or at a remote data store.

Figure 7:
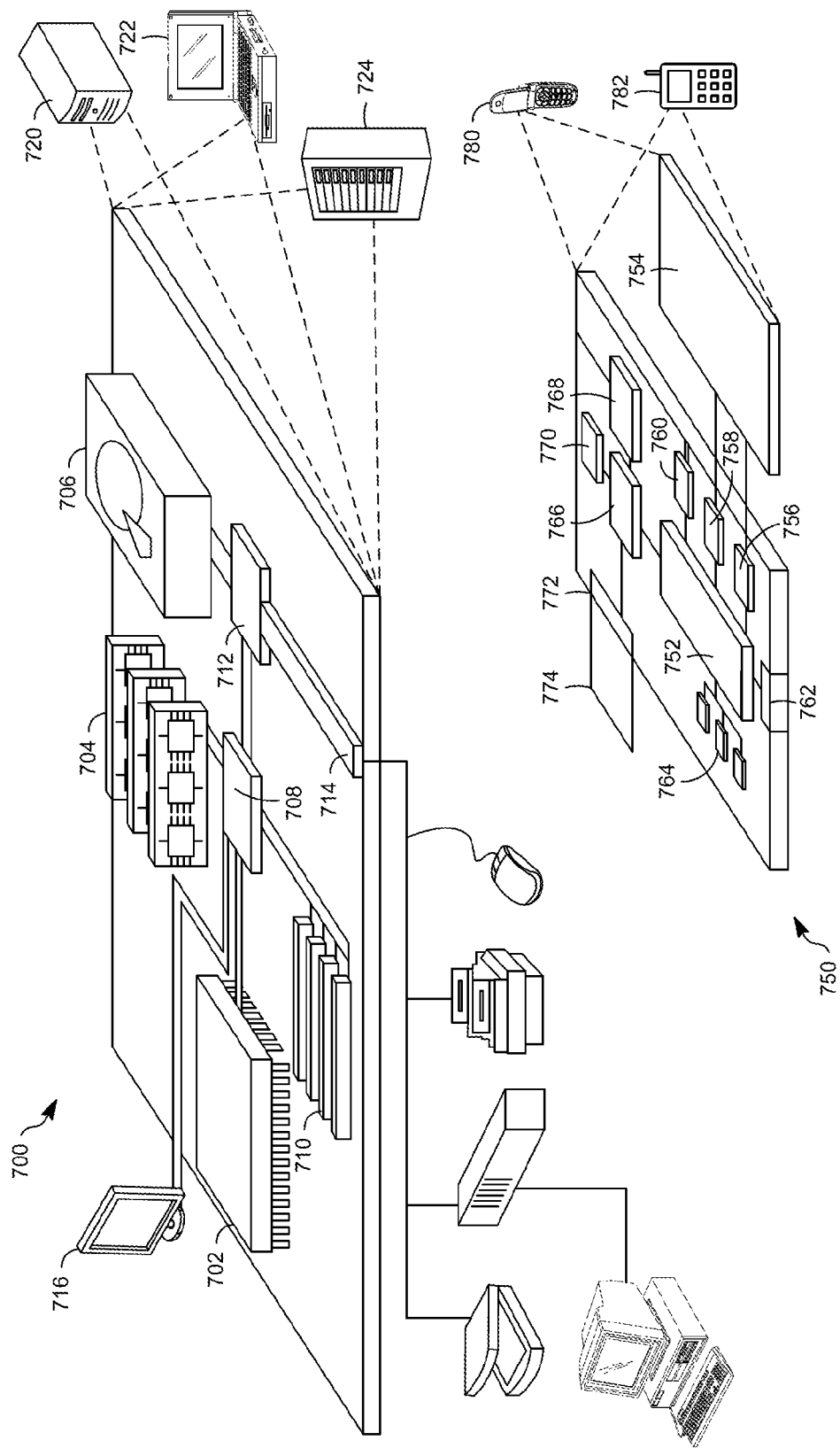
FIG. 7 is a diagram illustrating a computing device and a mobile computing device that can be used to implement the techniques described here in accordance with an example embodiment.

FIG. 7 is a diagram that shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used here, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
providing, using a microprocessor of a computing device associated with a web publisher, content including a web page;
accessing, by the web publisher, a list including at least one extension associated with a web browser that renders the content at a second computing device, and a key generated based on the content, wherein
the content is rendered by the web browser using the at least one extension, the key being generated at a specific time after the providing, and the key being generated using a reversible function configured to generate the content from the key and the key from the content;
comparing a value associated with the key to an expected value to determine a difference between the key and the expected value;
determining whether an extension, from the list of at least one extension, has modified the content based on the difference between the key and the expected value, where the determining is performed by the microprocessor of the computing device associated with the web publisher, using iterative comparisons of a plurality of keys from a plurality of different browsers, to the expected value; and
upon determining the extension has modified the content, providing code to the second computing device, the code, when execute by the second computing device preventing operation of the extension on the web page.

2. The method of claim 1, where the list includes all extensions installed in the web browser.

3. The method of claim 1, further comprising: locking the content being rendered on the web browser at a specific time identified by the web publisher.

4. The method of claim 3, where the locking is performed by the web browser.

5. The method of claim 1, further comprising generating the key using the web browser.

6. The method of claim 5, further comprising creating the key using a checksum of the content.

7. The method of claim 5, further comprising creating the key using a trace.

8. The method of claim 5, further comprising creating the key based on a text file version of a document object model of the web page.

9. The method of claim 1, further comprising recreating the content using the key.

10. A system comprising:
a memory storing a set of instructions; and
a processor configured to execute the set of instructions to cause the system to:
provide content including a web page;
receive a list including at least one extension associated with a web browser rendering the content at a computing device, and a key generated based on the content, wherein
the content is rendered by the web browser using the at least one extension, the key being generated at a specific time, and
the key being generated using a reversible function configured to generate the content from the key and the key from the content;
compare a value associated with the key to an expected value to determine a difference between the key and the expected value;
determine whether an extension from the list has modified the content based on the difference between the key and the expected value, wherein determining whether an extension has modified the content, is performed by the microprocessor of the computing device associated with the web publisher, using iterative comparisons of a plurality of keys from a plurality of different browsers, to the expected value; and upon determining the extension has modified the content, provide code to the computing device, the code, when execute by the computing device prevents operation of the extension on the web page.

11. The system of claim 10, where the system determines the extension using iterative comparisons of a plurality of keys to a plurality of expected values.

12. The system of claim 10, where the list includes all extensions installed in the web browser.

13. The system of claim 10, where the processor is further configured to execute the set of instructions to cause the system to lock the content being rendered on the web browser at a specific time identified by a web publisher.

14. The system of claim 10, where the key is generated by the web browser.

15. A non-transitory computer readable medium containing instructions that when executed cause a microprocessor of a computer system to:

provide content including a web page;

receive a list including at least one extension associated with a web browser rendering the content at a computing device, and a key generated based on the content, wherein the content is rendered by the web browser using the at least one extension, the key being generated at a specific time, and the key being generated using a reversible function configured to generate the content from the key and the key from the content;

compare a value associated with the key to an expected value to determine a difference between the key and the expected value;

determine whether an extension from the list has modified the content based on the difference between the key and the expected value, wherein determining whether an extension has modified the content, is performed by the microprocessor of the computing device associated with the web publisher, using iterative comparisons of a plurality of keys from a plurality of different browsers, to the expected value; and upon determining the extension has modified the content, provide code to the computing device, the code, when execute by the computing device prevents operation of the extension on the web page.

16. The non-transitory computer readable medium of claim 15, where the extension modified the content when it was being rendered using the web browser.

17. The non-transitory computer readable medium of claim 15, where the list includes all extensions associated with the web browser rendering the content at the computing device.

18. The non-transitory computer readable medium of claim 15, where the instructions further cause the computer system to provide a specified time to the web browser to lock the content.

* * * * *